US009172790B2

(12) United States Patent
Garg

(10) Patent No.: US 9,172,790 B2
(45) Date of Patent: *Oct. 27, 2015

(54) MOBILE WIRELESS COMMUNICATIONS DEVICE FOR HEARING AND/OR SPEECH IMPAIRED USER

(75) Inventor: Neeraj Garg, Milton, CA (US)

(73) Assignee: BlackBerry Limited, Waterloo (CA)

( * ) Notice: Subject to any disclaimer, the term of this patent is extended or adjusted under 35 U.S.C. 154(b) by 531 days.

This patent is subject to a terminal disclaimer.

(21) Appl. No.: 13/610,630

(22) Filed: Sep. 11, 2012

(65) Prior Publication Data

US 2012/0329518 A1  Dec. 27, 2012

Related U.S. Application Data

(63) Continuation of application No. 12/394,100, filed on Feb. 27, 2009, now Pat. No. 8,280,434.

(51) Int. Cl.
*H04M 1/00* (2006.01)
*H04M 1/725* (2006.01)
*G10L 13/00* (2006.01)

(52) U.S. Cl.
CPC .......... *H04M 1/72591* (2013.01); *G10L 13/00* (2013.01); *H04M 1/72552* (2013.01); *H04M 1/72594* (2013.01)

(58) Field of Classification Search
CPC ..................... H04M 1/72552; H04M 1/72591; G10L 13/00
USPC ......... 455/556.1, 556.2, 566, 575.1; 704/271, 704/235, 260, 4
See application file for complete search history.

(56) References Cited

U.S. PATENT DOCUMENTS

| 4,414,431 | A | 11/1983 | McCartney |
| 5,982,853 | A | 11/1999 | Liebermann |
| 5,995,590 | A | 11/1999 | Brunet et al. |

(Continued)

FOREIGN PATENT DOCUMENTS

| GB | 2183880 | 6/1987 |
| WO | 0169895 | 9/2001 |

OTHER PUBLICATIONS

"Deaf Blind Children Can Be Taught to Enjoy Dance," Article from Internet: http://web.archive.org/web/20071013145046/http://dance-to-health-help-your-special-needs-child.com/deaf-blind.html; Oct. 2007; pp. 1-2.

(Continued)

*Primary Examiner* — Vibol Tan
(74) *Attorney, Agent, or Firm* — Steven M. Greenberg, Esq.; Donna Flores, Esq.; CRGO LAW

(57) ABSTRACT

A mobile wireless communications device includes a housing and transceiver carried by the housing for transmitting and receiving radio frequency (RF) signals carrying communications data of speech. A processor is coupled to the transceiver for processing the communications data as speech that is transmitted and received to and from the transceiver. A keyboard and display is carried by the housing and connected to the processor. A speech-to-text and text-to-speech module converts communications data as speech received from the transceiver to text that is displayed on the display and converting text that is typed by a user on the keyboard in the communications data as speech to be transmitted from the transceiver as an RF signal.

22 Claims, 9 Drawing Sheets

(56) References Cited

U.S. PATENT DOCUMENTS

| | | | |
|---|---|---|---|
| 6,377,925 | B1 | 4/2002 | Greene et al. |
| 6,701,162 | B1 * | 3/2004 | Everett .................. 455/556.1 |
| 6,708,152 | B2 | 3/2004 | Kivimaki |
| 7,027,568 | B1 | 4/2006 | Simpson et al. |
| 7,664,531 | B2 | 2/2010 | Kojima et al. |
| 8,027,276 | B2 | 9/2011 | Nierhaus |
| 2004/0186713 | A1 | 9/2004 | Gomas et al. |
| 2005/0058075 | A1 | 3/2005 | Gorday et al. |
| 2006/0015197 | A1 | 1/2006 | Gupta |
| 2006/0126873 | A1 * | 6/2006 | Lee .................................. 381/312 |
| 2006/0189278 | A1 * | 8/2006 | Scott ............................. 455/90.3 |
| 2006/0217982 | A1 | 9/2006 | Munro |
| 2008/0032672 | A1 | 2/2008 | Le et al. |
| 2008/0045274 | A1 | 2/2008 | Witkowski et al. |
| 2008/0057925 | A1 | 3/2008 | Ansari |
| 2008/0065984 | A1 | 3/2008 | Roediger et al. |
| 2008/0195373 | A1 | 8/2008 | Ander et al. |
| 2009/0012793 | A1 | 1/2009 | Dao et al. |
| 2010/0179991 | A1 * | 7/2010 | Lorch et al. .................... 709/206 |
| 2012/0191770 | A1 * | 7/2012 | Perlmutter et al. ........... 709/201 |

OTHER PUBLICATIONS

"Sorenson Offers Blackberry Text-to-Speech Relay for Hearing Impaired," Article from Internet: http://findarticles.com/p/articles/mi_MOECZ/is_2008-June_12/ai_266794291; Telecomworldwire; Jun. 2008; pp. 1-2.

* cited by examiner

US 9,172,790 B2

MOBILE WIRELESS COMMUNICATIONS DEVICE FOR HEARING AND/OR SPEECH IMPAIRED USER

RELATED APPLICATION

This application is a continuation of pending Ser. No. 12/394,100 filed Feb. 27, 2009, the entire disclosure of which is hereby incorporated herein by reference.

TECHNICAL FIELD

The present disclosure relates to the field of communications devices, and more particularly, to mobile wireless communications devices that can be used by hearing and/or speech impaired users.

BACKGROUND

Mobile wirelesses communications devices, such as cellular telephones, are now commonplace throughout the world. Most of these communications devices, however, are designed for users without hearing or speech impairments. When using a typical mobile wireless communications device in a normal phone conversation, both parties as sender and receiver must be able to hear and talk clearly. This causes a challenge for hearing impaired or speech challenged users. As society grows more complicated and interrelated, the needs of the handicapped, for example, the hearing impaired and/or speech challenged user, are increasingly being accommodated. One known system for accommodating a hearing impaired or speech challenged person uses a live agent as an intermediary, allowing the sender and caller to communicate to each other through this live agent. For example, the live agent receives text from a hearing impaired user and speaks to the other user, while receiving spoken voice from the other user. The live agent types text for the hearing impaired user and speaks text typed from that user to another. This is not an automatic process.

As voice-to-text technology evolves, for example, as associated with personal computers, the processing capability has increased such that it is possible to write down the spoken text in real-time using computer-based technologies and narrate a written text using computers. These technologies should be leveraged for use with mobile wireless communications devices as an aid for hearing or speech impaired people, thus eliminating the requirement for a live agent as a third party intermediary.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

Figure 1:
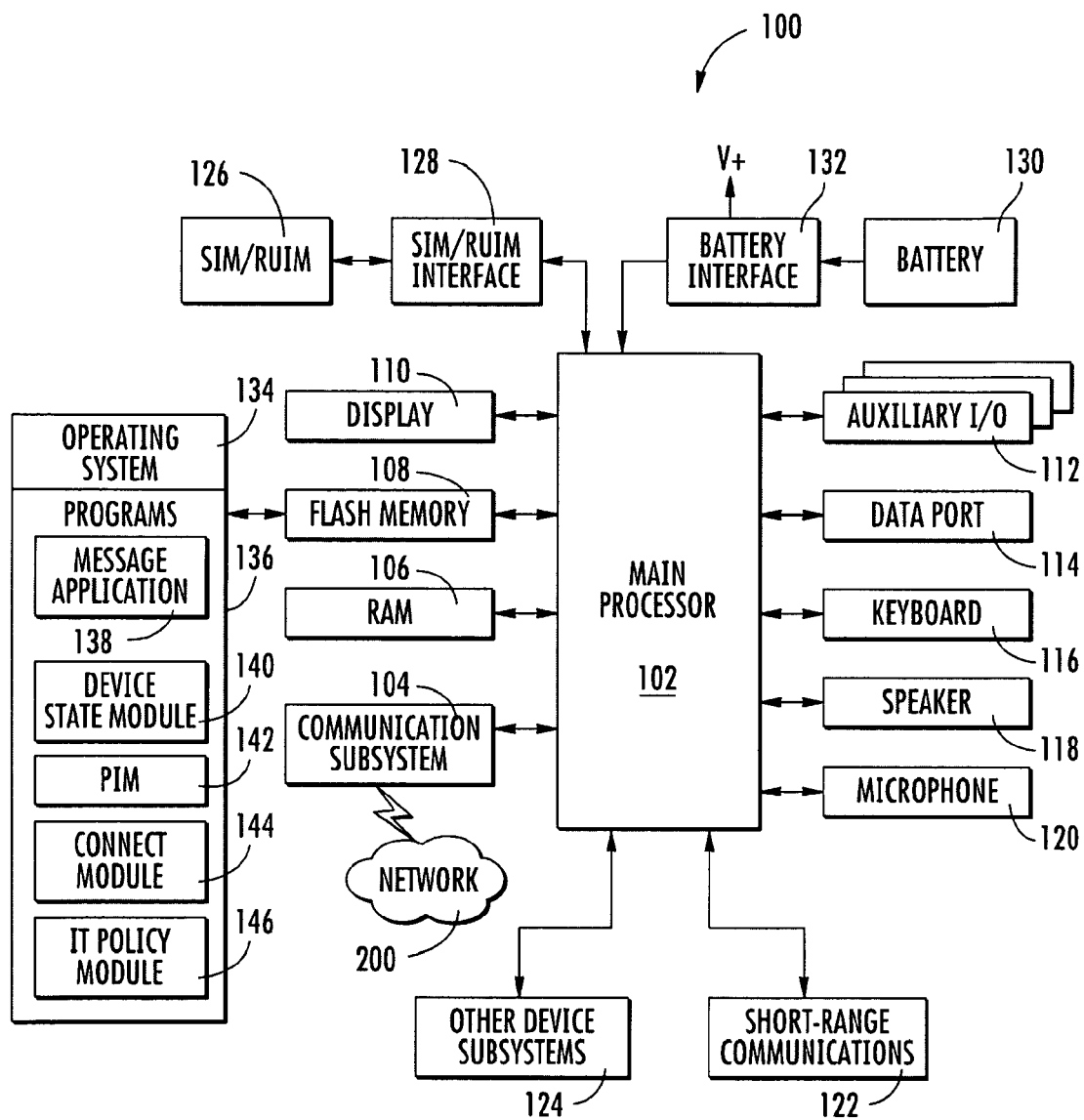
FIG. 1 is a block diagram of an example embodiment of a mobile device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

A mobile wireless communications device includes a housing and transceiver carried by the housing for transmitting and receiving radio frequency (RF) signals carrying communications data of speech. A processor is coupled to the transceiver for processing the communications data as speech that is transmitted and received to and from the transceiver. A keyboard and display is carried by the housing and connected to the processor. A speech-to-text and text-to-speech module converts communications data as speech received from the transceiver to text that is displayed on the display and converting text that is typed by a user on the keyboard in the communications data as speech to be transmitted from the transceiver as an RF signal.

The display provides an interface and the processor is configured for displaying a set up screen having a handicap option that is user selected for enabling the speech-to-text and text-to-speech module. The handicap option includes a default setting in one aspect. The device configuration can, in one example, have a handicap option with the phone set-up such that it knows the current user cannot hear. Upon receiving an incoming call or communication, pressing the receive button automatically invokes the handicap feature for speech-to-text and text-to-speech.

In another aspect, a speaker is carried by the housing and coupled to the processor for outputting audio speech received as communications data in addition to displaying the speech as text on the display. In yet another aspect, a key can be depressed in a telephone call that automatically generates a signal as communications data for speech indicative of a greeting in a telephone call. A key can be depressed that automatically generates a signal as communications data for speech indicative of ending a telephone call. In another aspect, a light emitting diode (LED) is carried by the housing and coupled to the processor, which is configured for generating a signal to the LED for activating the LED and displaying a light pattern indicative of speech. A plurality of LED's can be carried by the housing, each of a different color from another LED such that a color-coded light pattern is indicative of speech.

In yet another aspect, the speech-to-text and text-to-speech module is formed as a speech-to-text and text-to-speech processing circuit coupled to the processor. In yet another aspect, it is an application cooperating with operating software. The processor can be configured for converting speech to a virtual attendant displayed on the display that displays video of sign language patterns indicative of the received speech. A camera can be carried by the housing and coupled to the processor and configured for receiving images of a user allowing a user to transmit sign language video or view lips of a virtual attendant for lip reading. The display can also display different options for choosing LED patterns to be displayed or a virtual attendant.

A method aspect is also set forth.

Figure 2:
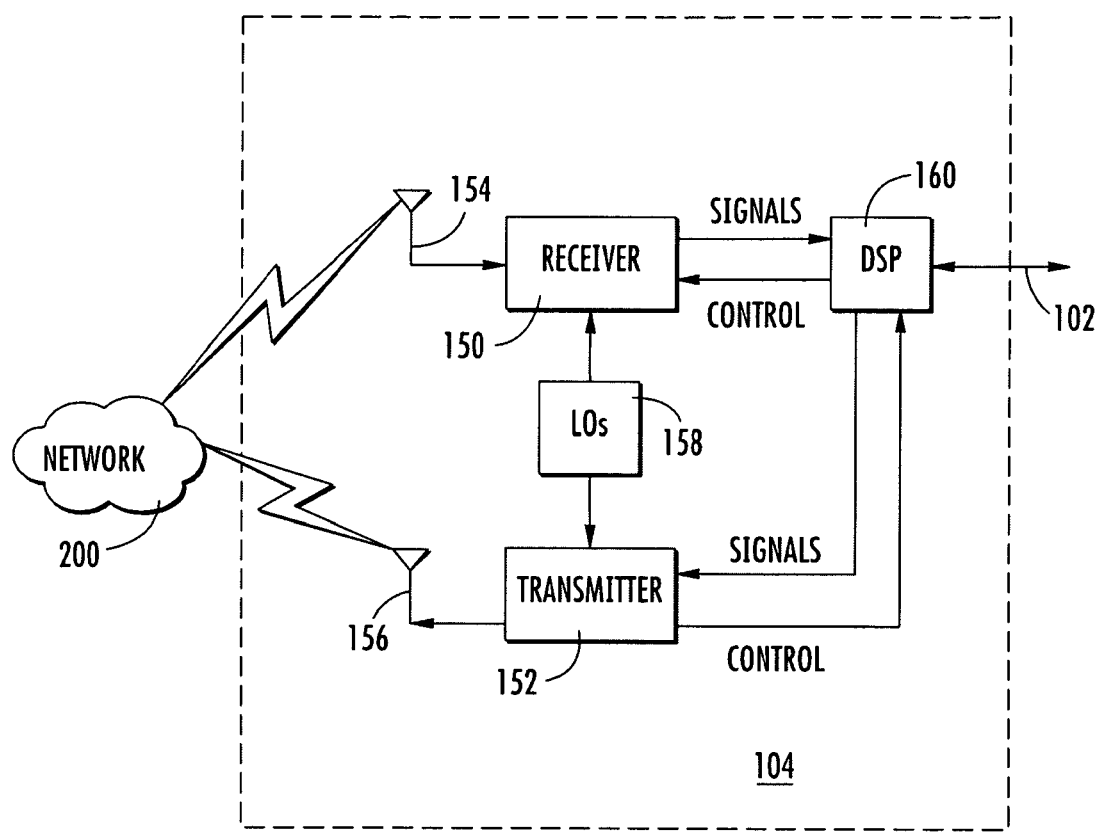
FIG. 2 is a block diagram of an example embodiment of a communication subsystem component of the mobile device of FIG. 1.
Figure 3:
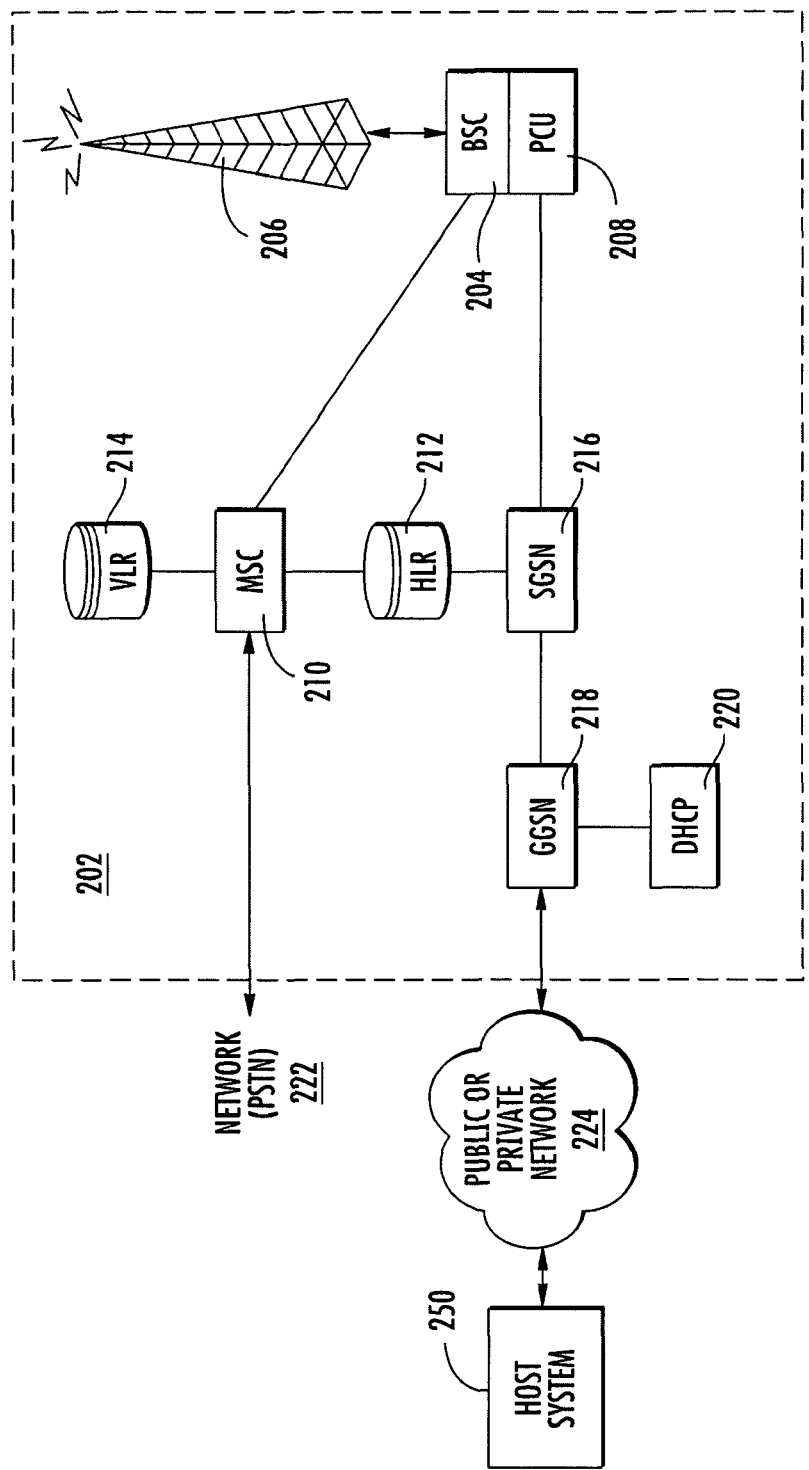
FIG. 3 is an example block diagram of a node of a wireless network.
Figure 5:
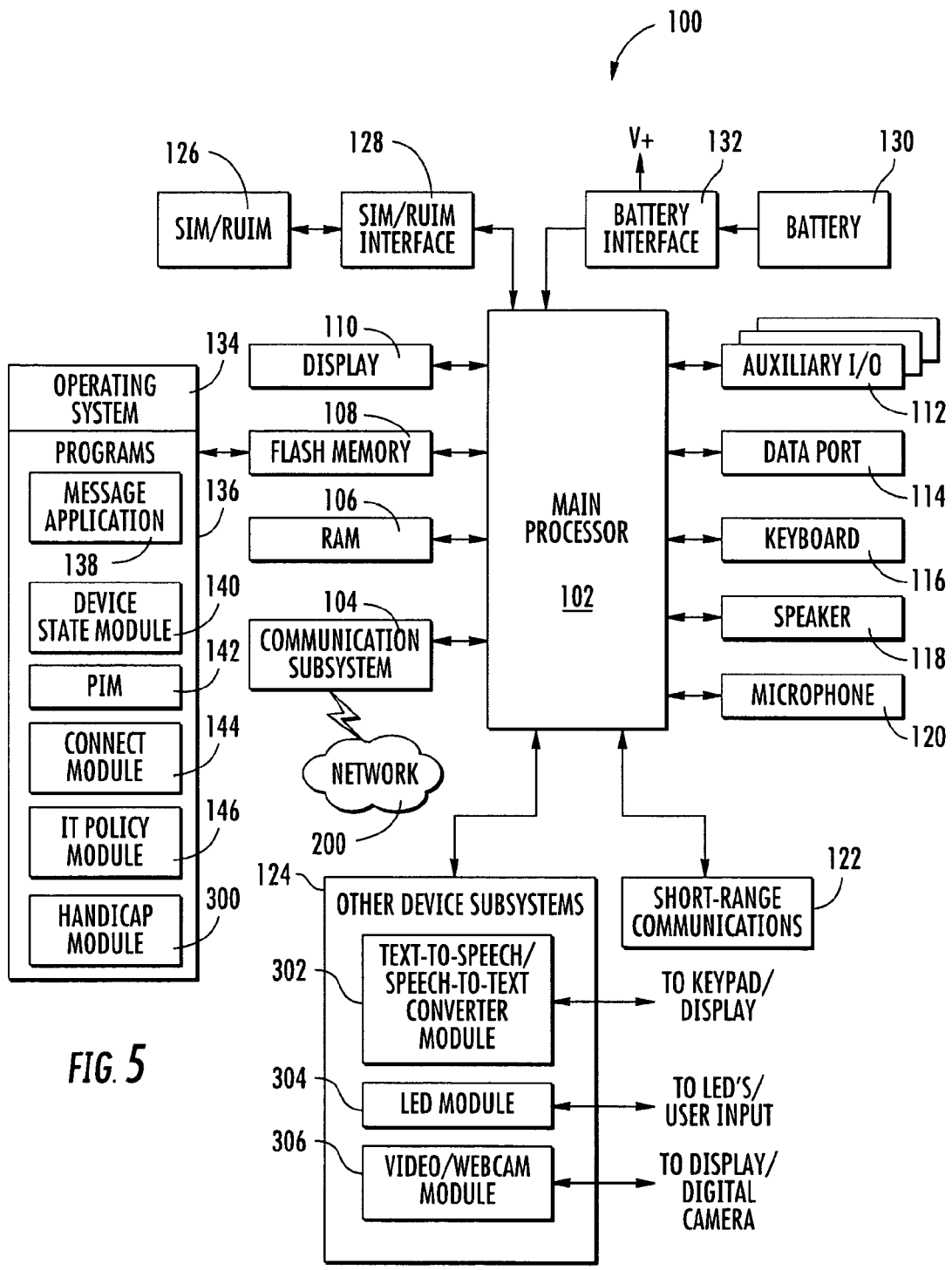
FIG. 5 is a block diagram of the example embodiment of the mobile device shown in FIG. 1 and showing greater details of other device subsystems that include a text-to-speech/speech-to-text converter module, LED module, and a video/webcam module that all operate in conjunction with the handicap module associated with the operating system.
Figure 6:
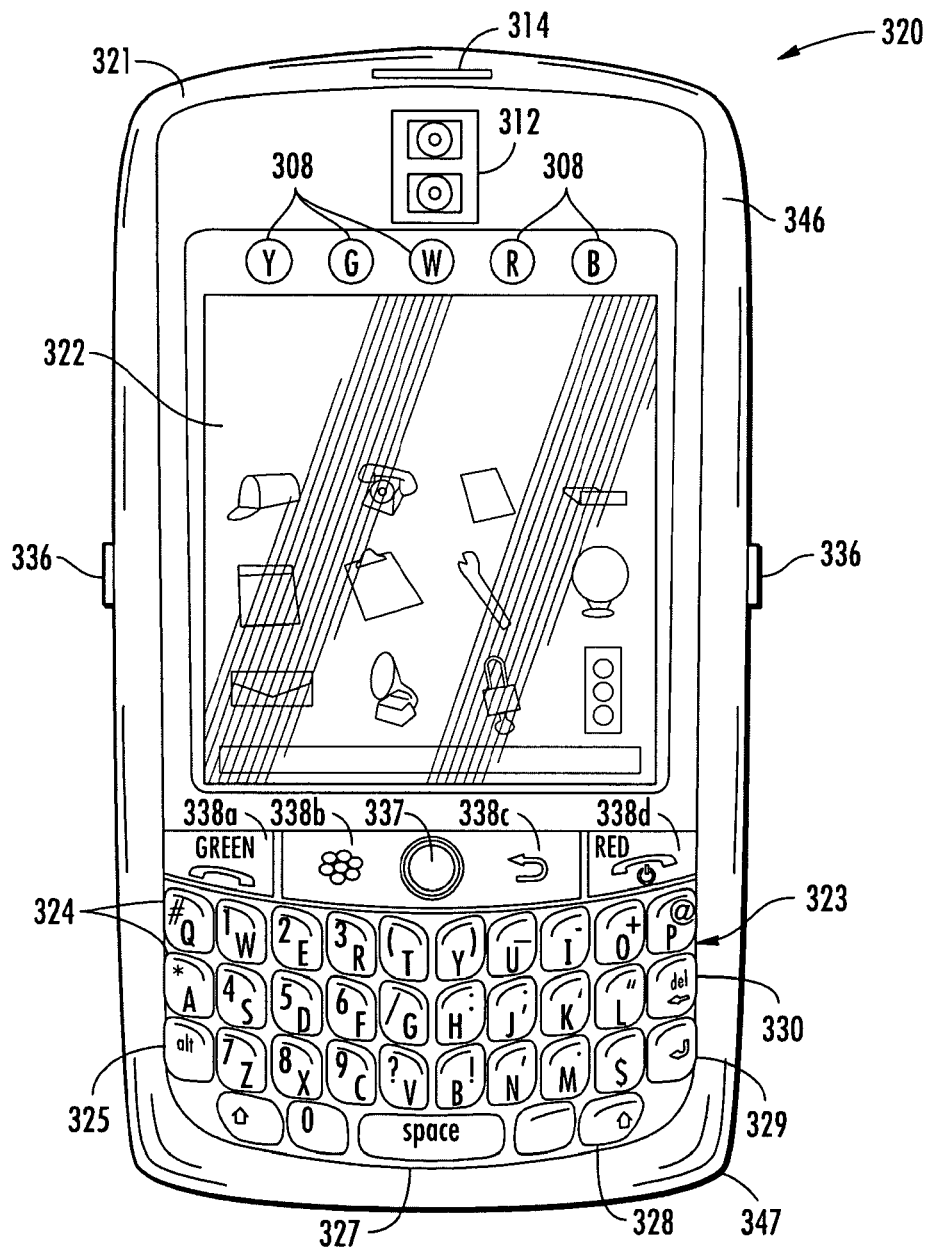
FIG. 6 is a front elevation view of a mobile wireless communications device that incorporates the functional components shown in the block diagram of the mobile device in FIG. 5 and used with the hearing and/or speech impaired user.

There now follows a description relative to FIGS. 1-4 of an example embodiment of a mobile device, such as a mobile wireless communications device shown in FIG. 6, communication subsystem component of the mobile device, a node in a wireless network that can be operable with the wireless device and components of a host system for use with the wireless network of FIG. 3 and the mobile device of FIG. 1. After a description of those components relative to FIGS. 1-4, a further description will follow of examples for a mobile wireless communications device that can be used by the hearing or speech-impaired and includes a handicap option as part of a set up wizard for a user interface. FIG. 5 shows the additional device subsystems for accommodating hearing and speech-impaired users. Menu options that are displayed in a set up wizard for hearing and speech-impaired users are illustrated with reference to FIGS. 7 and 8.

The example embodiments described herein generally relate to a mobile wireless communication device, hereafter referred to as a mobile device, which can be configured according to an IT policy. It should be noted that the term IT policy, in general, refers to a collection of IT policy rules, in which the IT policy rules can be defined as being either grouped or non-grouped and global or per-user. The terms grouped, non-grouped, global and per-user are defined further below. Examples of applicable communication devices include pagers, cellular phones, cellular smart-phones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIGS. 1-4.

Referring first to FIG. 1, shown therein is a block diagram of an example embodiment of a mobile device 100. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the example embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one example implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 requires a SIM/RUIN card 126 (i.e., Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as email, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RU™ 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. In at least some example embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows a user of the mobile device 100 to send and receive electronic messages. Various alternatives exist for the message application 138 as is well known to those skilled in the art. Messages that have been sent or received by the user are typically stored in the flash memory 108 of the mobile device 100 or some other suitable storage element in the mobile device 100. In at least some example embodiments, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 100 is turned off or loses power.

The PIM 142 includes functionality for organizing and managing data items of interest to the user, such as, but not limited to, email, contacts, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 also includes a connect module 144, and an IT policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 3 and 4, which are described in more detail below.

The connect module 144 includes a set of APIs that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 100. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some example embodiments, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

Other types of software applications can also be installed on the mobile device 100. These software applications can be third party applications, which are added after the manufacture of the mobile device 100. Examples of third party applications include games, calculators, utilities, etc.

The additional applications can be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an email message, or web page download will be processed by the communication subsystem 104 and input to the main processor 102. The main processor 102 will then process the received signal for output to the display 110 or alternatively to the auxiliary I/O subsystem 112. A subscriber may also compose data items, such as email messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Referring now to FIG. 2, an example block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 2 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Referring now to FIG. 3, a block diagram of an example implementation of a node 202 of the wireless network 200 is shown. In practice, the wireless network 200 includes one or more nodes 202. In conjunction with the connect module 144, the mobile device 100 can communicate with the node 202 within the wireless network 200. In the example implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (FCU) 208 that connects to the SGSN 216 to control segmentation, radio channel allocation and to satisfy packet switched requirements. To track the location of the mobile device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell." The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support, namely packet switched data support, within GSM. The SGSN 216 and the MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its PDP Context, the PDP Context can be de-allocated and the IP address returned to the IP address pool managed by the DHCP server 220.

Figure 4:
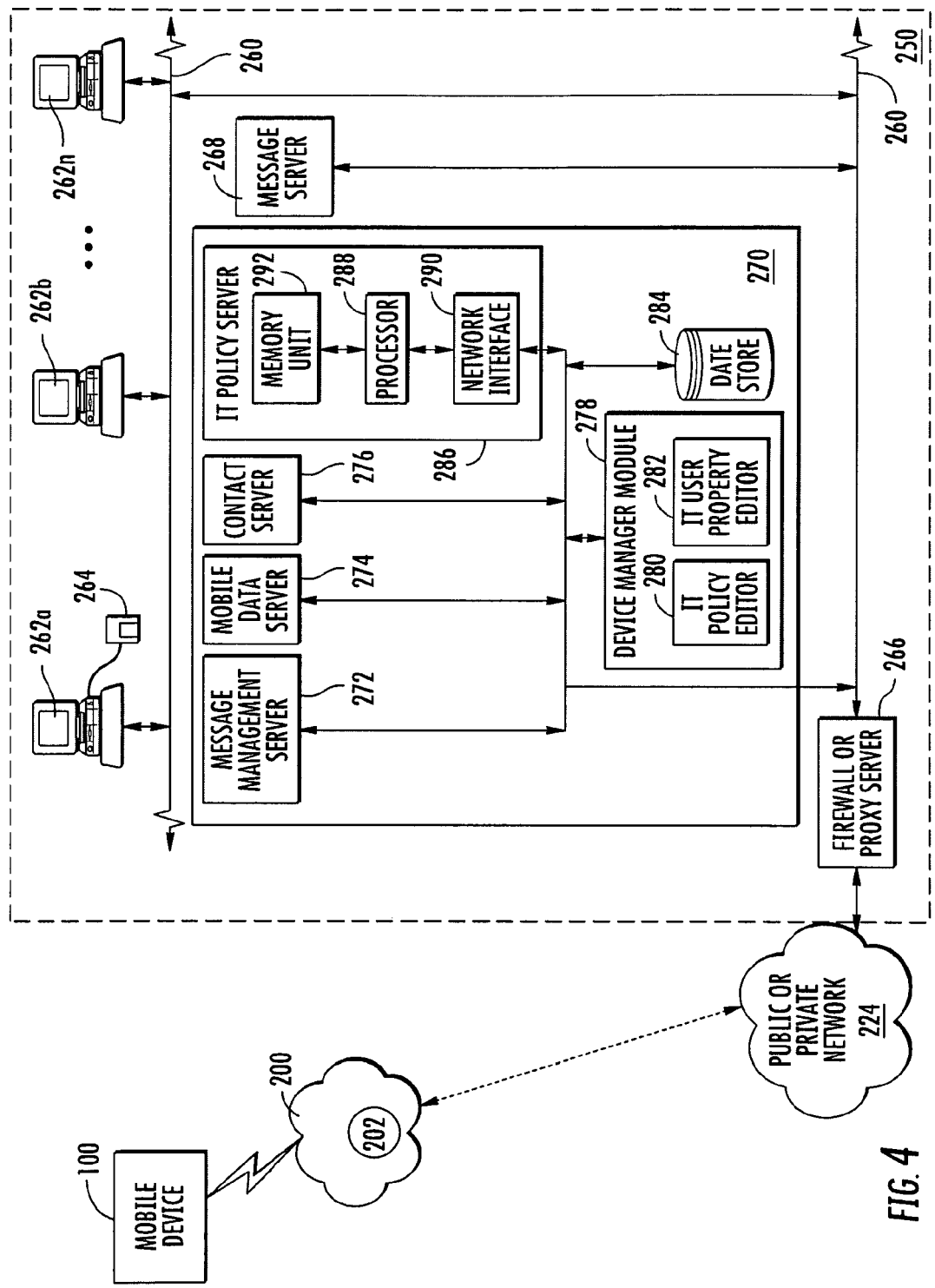
FIG. 4 is a block diagram illustrating components of a host system in one example configuration for use with the wireless network of FIG. 3 and the mobile device of FIG. 1.

Referring now to FIG. 4, shown therein is a block diagram illustrating components of an example configuration of a host system 250 that the mobile device 100 can communicate with in conjunction with the connect module 144. The host system 250 will typically be a corporate enterprise or other local area network (LAN), but may also be a home office computer or some other private system, for example, in variant implementations. In this example shown in FIG. 4, the host system 250 is depicted as a LAN of an organization to which a user of the mobile device 100 belongs. Typically, a plurality of mobile devices can communicate wirelessly with the host system 250 through one or more nodes 202 of the wireless network 200.

The host system 250 includes a number of network components connected to each other by a network 260. For instance, a user's desktop computer 262a with an accompanying cradle 264 for the user's mobile device 100 is situated on a LAN connection. The cradle 264 for the mobile device 100 can be coupled to the computer 262a by a serial or a Universal Serial Bus (USB) connection, for example. Other user computers 262b-262n are also situated on the network 260, and each may or may not be equipped with an accompanying cradle 264. The cradle 264 facilitates the loading of information (e.g., PIM data, private symmetric encryption keys to facilitate secure communications) from the user computer 262a to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262a-262n will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this example configuration. More generally, the host system 250 may represent a smaller part of a larger network (not shown) of the organization, and may comprise different components and/or be arranged in different topologies than that shown in the example embodiment of FIG. 4.

To facilitate the operation of the mobile device 100 and the wireless communication of messages and message-related data between the mobile device 100 and components of the host system 250, a number of wireless communication support components 270 can be provided. In some implementations, the wireless communication support components 270 can include a message management server 272, a mobile data server 274, a contact server 276, and a device manager module 278. The device manager module 278 includes an IT Policy editor 280 and an IT user property editor 282, as well as other software components for allowing an IT administrator to configure the mobile devices 100. In an alternative example embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the mobile devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this example embodiment, the mobile device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the mobile device 100. The wireless VPN router allows a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 100 in this alternative implementation.

Messages intended for a user of the mobile device 100 are initially received by a message server 268 of the host system 250. Such messages may originate from any number of sources. For instance, a message may have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly email messages, within the organization and over the shared network infrastructure 224. Each user in the organization that has been set up to send and receive messages is typically associated with a user account managed by the message server 268. Some example implementations of the message server 268 include a Microsoft Exchange™ server, a Lotus Domino™ server, a Novell Groupwise™ server, or another suitable mail server installed in a corporate environment. In some implementations, the host system 250 may comprise multiple message servers 268. The message server 268 may also be adapted to provide additional functions beyond message management, including the management of data associated with calendars and task lists, for example.

When messages are received by the message server 268, they are typically stored in a data store associated with the message server 268. In at least some example embodiments, the data store may be a separate hardware unit, such as data store 284, that the message server 268 communicates with. Messages can be subsequently retrieved and delivered to users by accessing the message server 268. For instance, an email client application operating on a user's computer 262a may request the email messages associated with that user's account stored on the data store associated with the message server 268. These messages are then retrieved from the data store and stored locally on the computer 262a. The data store associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (i.e., those received in the past two to three months for example) can be stored on the mobile device 100.

When operating the mobile device 100, the user may wish to have email messages retrieved for delivery to the mobile device 100. The message application 138 operating on the mobile device 100 may also request messages associated with the user's account from the message server 268. The message application 138 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 100 is assigned its own email address, and messages addressed specifically to the mobile device 100 are automatically redirected to the mobile device 100 as they are received by the message server 268.

The message management server 272 can be used to specifically provide support for the management of messages, such as email messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e.g., the message store associated with the user's account on the message server 268) for new email messages, and apply user-definable filters to new messages to determine if and how the messages are relayed to the user's mobile device 100. The message management server 272 may also compress and encrypt new messages (e.g., using an encryption technique such as Data Encryption Standard (DES), Triple DES, or Advanced Encryption Standard (AES)) and push them to the mobile device 100 via the shared network infrastructure 224 and the wireless network 200. The message management server 272 may also receive messages composed on the mobile device 100 (e.g., encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the mobile device 100 can be defined (e.g., by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g., "blocks") of a message stored on the message server 268 to the mobile device 100. For example, in some cases, when a message is initially retrieved by the mobile device 100 from the message server 268, the message management server 272 may push only the first part of a message to the mobile device 100, with the part being of a pre-defined size (e.g., 2 KB). The user can then request that more of the message be delivered in similar-sized blocks by the message management server 272 to the mobile device 100, possibly up to a maximum pre-defined message size. Accordingly, the message management server 272 facilitates better control over the type of data and the amount of data that is communicated to the mobile device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion as the address book on the mobile device 100. Accordingly, for a given contact, the contact server 276 can include the name, phone number, work address and email address of the contact, among other information. The contact server 276 can also provide a global address list that contains the contact information for all of the contacts associated with the host system 250.

It will be understood by persons skilled in the art that the message management server 272, the mobile data server 274, the contact server 276, the device manager module 278, the data store 284 and the IT policy server 286 do not need to be implemented on separate physical servers within the host system 250. For example, some or all of the functions associated with the message management server 272 may be integrated with the message server 268, or some other server in the host system 250. Alternatively, the host system 250 may comprise multiple message management servers 272, particularly in variant implementations where a large number of mobile devices need to be supported.

Alternatively, in some example embodiments, the IT policy server 286 can provide the IT policy editor 280, the IT user property editor 282 and the data store 284. In some cases, the IT policy server 286 can also provide the device manager module 278. The processor 288 of the IT policy server 286 can be used to perform the various steps of a method for providing IT policy data that is customizable on a per-user basis. The processor 288 can execute the editors 280 and 282. In some cases, the functionality of the editors 280 and 282 can be provided by a single editor. In some cases, the memory unit 292 can provide the data store 284.

The device manager module 278 provides an IT administrator with a graphical user interface with which the IT administrator interacts to configure various settings for the mobile devices 100. As mentioned, the IT administrator can use IT policy rules to define behaviors of certain applications on the mobile device 100 that are permitted such as phone, web browser or Instant Messenger use. The IT policy rules can also be used to set specific values for configuration settings that an organization requires on the mobile devices 100 such as auto signature text, WLAN/VoIP/VPN configuration, security requirements (e.g., encryption algorithms, password rules, etc.), specifying themes or applications that are allowed to run on the mobile device 100, and the like.

FIG. 5 is a block diagram showing functional components of the mobile wireless communications device similar to that shown in FIG. 1, but also showing added components with functionality that can be used as a handicap option. The mobile wireless communications device can be used by hearing and/or speech-impaired users in accordance with a non-limiting aspect. For this description of the handicap options and functional components, including a user interface as a set up wizard, reference numerals begin in the 300 series.

As shown in FIG. 5, the software operating system 134 works in conjunction with different software programs 136, which can include a handicap module 300 as a software program that operates with various components as part of the other added device subsystems 124. These subsystems can include a text-to-speech/speech-to-text converter module 302 that interoperates with the keyboard 116 and display such as part of the auxiliary I/O 112. A light emitting diode (LED) module 304 interoperates with LED's positioned on the front of the mobile wireless communications device such as explained later with reference to FIG. 6. A video/webcam module 306 interoperates with the display and digital camera device (as part of auxiliary I/O 112) positioned on the front of the mobile wireless communications device explained below relative to FIG. 6. It should be understood that each of the modules 302, 304, 306 can be separate processors or a subunit of the main processor 302, an application software module as associated with the operating software, part of a handicap module 300 or any combination.

The handicap module 300 can incorporate software code from different operating software, including C++ for code. The handicap module 300 and device subsystem 124 operate together to facilitate a phone conversation for hearing impaired and/or speech challenged users. In the example embodiment shown in FIG. 5, any received phone call can be translated within the mobile wireless communications device and text displayed, enabling a speech-impaired user to read a voice conversation. In response, the user can type text that is converted to communications data as voice and transmitted on an RF signal back to the other user at a remote location such as another user in a phone conversation. This is especially relevant when the hearing impaired user is also speech impaired, making a response difficult. As an adjunct to the text-to-speech/speech-to-text conversion, it is possible to activate the LED module 304 such that LED's positioned on the front cover of the mobile wireless communications device would display lights indicative of speech, for example, as a pattern similar to Morse code. Not only could text be displayed, but also lights turned on or off indicative of a certain pattern of speech. Different colors could be used. Also, the main processor 102 and other device subsystems 124 could process the speech-to-text conversion to display lights in a certain pattern such as Morse code to assist the hearing impaired. A button as an input such as a track ball could be pressed for transmitting Morse code type signals or similar signals indicate of voice in addition to transmitting letters, which are displayed on the screen. For example, while text is being typed, light emitting diodes could blink in a pattern indicative of the letters or words being typed to assist the user.

The video/webcam module 306 interoperates with the display and digital camera (shown and explained in greater detail in FIG. 6) such that a user can receive text that had been processed in the text-to-speech/speech-to-text converter module 302. The user holds the mobile wireless communications device somewhat parallel to their body and engages in sign language communication that can be transmitted as video back to another user.

The mobile wireless communications device overcomes the drawbacks of known services for deaf and hard-of-hearing individuals that use a relay system that allows a user to contact a communication assistant via an application that is typically downloaded into the mobile wireless communications device. In that system, a user provides a contact number for a desired hearing-able, human agent contact and communicates with this human agent contact via a "chat" screen into which the user can type their messages. The communication assistant relays messages to their destination and transfers the contact's response back to text to the hard-of-hearing user via the "chat" screen, thus, establishing two-way, text-to-speech and speech-to-text communication. The mobile wireless communications device as described relative to FIGS. 1-5 and FIGS. 6-8 obviates the necessity for using a third party communication assistant as a live person agent and the process is instead automated.

It is possible for some of the functionality as described to be implemented on the server side instead of the mobile wireless communications device as described relative to FIG. 5. For example, some of the processing such as shown in the other device subsystems 124 of FIG. 5, for example, the text-to-speech/speech-to-text converter module 302, LED module 304, and video/webcam module 306 could be implemented in the server side, for example, within a node 202 as shown in FIG. 3. An example could be software functionality or system circuitry incorporated in the MSC 210 or BSC 204 as non-limiting examples.

It should be understood that hearing impaired people can communicate using many mechanisms such as "reading text," reading lips, and visualizing changes to light patterns. The system and mobile wireless communications device as described encompasses these mechanisms. The hearing impaired person does not need to be initiating the call and the mobile wireless communications device through its set up wizard or preprogramming is aware that the owner is hearing impaired.

For example, a setting inside the phone such as part of the software operating system in conjunction with the handicap module 306 could indicate the physical challenges the owner may have. In accordance with the specific other device subsystems 124 and the special hardware circuits or modules, the mobile wireless communications device could have special circuitry adapted for specific users that are handicapped with any physical challenges, such as being hearing impaired and/or speech challenged. For those that have difficulty seeing and hearing, the use of the light emitting diodes positioned on the front cover of the mobile wireless communications device would be helpful in conjunction with the text-to-speech/speech-to-text implementation.

FIG. 6 shows a detailed view of a mobile wireless communications device 320 as a non-limiting example and shows five light emitting diodes 308 positioned above the display as a yellow, green, white, red and blue LED's and referred to by the initials Y, G, W, R and B and connected to the processor 102 and module 304. A digital camera 312 is positioned above the display 322 as illustrated and could be similarly formed as a camera that typically is positioned on the rear surface (not shown) of the mobile wireless communications device 320 that is used for taking pictures and video images and using the display 322 as a view finder. The camera 312 is connected to the processor 102 in this example and to module 306.

A brief description will now proceed relative to FIG. 6, which shows an example of the mobile wireless communications device 320, for example, a handheld portable radio device, which can incorporate as non-limiting examples the various mobile device circuits of the mobile device described above relative to FIGS. 1-5.

Referring now to FIG. 6, an example of the mobile wireless communications device 320 illustratively includes a housing 321 having an upper portion 346 and a lower portion 347, and typically carries a dielectric substrate, i.e., circuit board (not shown), such as a conventional printed circuit board (PCB) substrate. The circuit board can be any dielectric substrate, PCB, ceramic substrate or other circuit carrying structure for carrying signal circuits and electronic components within the mobile wireless communications device 320. The illustrated housing 321 is typically a static housing, for example, as opposed to a flip or sliding housing, which is used in many similar mobile devices and cellular telephones. However, these flip and sliding and other housing configurations may also be used.

Circuitry as described relative to the mobile device description in FIGS. 1-5 is carried by the circuit board. It should be understood that any keyboard circuitry could be on a separate keyboard, etc., as will be appreciated by those skilled in the art. A battery (not shown) is also preferably carried by the housing 121 for supplying power to any circuitry. The circuit board typically carries a main antenna (not shown) at the lower end of the housing. It could carry other antennae such as a diversity antenna at the upper end of the housing or at other locations.

Furthermore, an audio output transducer 314 (e.g., a speaker) is carried by an upper portion 346 of the housing 121 and connected to the internal circuitry. One or more user input interface devices, such as a keypad (keyboard) 323 is also preferably carried by the housing 321 and connected to the internal circuitry. The term keypad 323 as used herein also refers to the term keyboard, indicating the user input devices having lettered and/or numbered keys commonly known and other example embodiments, including multi-top or predictive entry modes as shown in this example. Other examples of user input interface devices include a track ball 337 and convenience keys 336, which could be positioned on the left and right sides of the housing. Around the track ball 337 are positioned other user input keys such as the green send (or receive) key 338a, menu key 338b, escape key 338c, and the red end/power key 338d. In one example, upon receiving an incoming call or communication, when the handicapped user presses the green send (or receive) key, the device automatically invokes the handicap feature for speech-to-text and text-to-speech. Of course, it will be appreciated that other user input interface devices (e.g., a stylus or touch screen interface) may be used in other example embodiments. Other input interface devices could be used, for example, a mute/standby key, volume key or other menu key. The housing could incorporate headset pads, USE ports, media card slots and other similar keys or inputs.

Another antenna such as a diversity antenna or a WiFi or WLAN (e.g., Bluetooth, IEEE 802.11) antenna can provide WLAN communication capabilities and/or a satellite positioning system (e.g., GPS, Galileo, etc.) antenna for providing position location capabilities, as will be appreciated by those skilled in the art. Other examples of auxiliary I/O devices 112 in FIG. 1 and described before could include the audio output transducer 314 (e.g., a speaker for speaker phone operation), and another digital camera lens (not shown) positioned on the rear surface of the device for providing digital camera capabilities to a user such as when photographing events or people and using the display as a viewer, an electrical device connector (e.g., USE, headphone, secure digital (SD) or memory card, etc.).

It should be noted that the term "input/output" as used herein for the auxiliary I/O device(s) means that such devices may have input and/or output capabilities, and they need not provide both in all example embodiments. That is, devices such as camera lenses may only receive an optical input, for example, while a headphone jack may only provide an audio output.

The mobile wireless communications device 320 further includes the display 322 as noted before, for example, a liquid crystal display (LCD) carried by the housing 321 and connected to the internal circuitry described relative to FIGS. 1-5, and more particularly, to the processor 102 and modules 302 and 306. Convenience keys 336 and the track ball 337 can also be connected to the internal circuitry for allowing a user to navigate menus, text, etc., as will be appreciated by those skilled in the art. The track ball 337 may also be referred to as a "thumb wheel" or a "track wheel" in some instances and positioned in different locations depending on mobile device design. The keypad 323 is typically connected to the processor 102 and module 302 and 304 illustratively includes a plurality of multi-symbol keys 324 each having indicia of a plurality of respective symbols thereon. The keypad 323 also illustratively includes an alternate function key 325, a space key 327, a shift key 328, a return (or enter) key 329, and a backspace/delete key 330. Other keys are also illustrated.

As seen in FIG. 6, the multi-symbol keys 324 are arranged in the rows on the keypad 323. Furthermore, the letter symbols on each of the keys 324 are arranged to define a QWERTY layout. That is, the letters on the keypad 323 are presented in a three-row format, with the letters of each row being in the same order and relative position as in a standard QWERTY keypad. Each row of keys can be arranged in columns.

Accordingly, the mobile wireless communications device 120 as described may advantageously be used not only as a traditional cellular phone, but it may also be conveniently used for sending and/or receiving data over a cellular or other network, such as Internet and email data, for example as explained above relative to FIGS. 1-5. Of course, other keypad configurations may also be used in other example embodiments. Multi-tap or predictive entry modes may be used for typing emails, etc. as will be appreciated by those skilled in the art.

The mobile wireless communications device shown in FIG. 6 and described relative to FIGS. 1-5 can incorporate email and messaging accounts and provide different functions such as composing email, PIN messages, and SMS messages as described above relative to FIGS. 1-5. The device 302 can manage messages through an appropriate menu that can be retrieved by choosing various icons, for example, a messages icon. An address book function could add contacts, allow management of an address book, set address book options and manage SIM card phone books. A phone menu could allow for the making and answering of phone calls using different phone features, managing phone call logs, setting phone options, and viewing phone information. A browser application could permit the browsing of web pages, configuring a browser, adding bookmarks, and changing browser options. Other applications could include a task, memo pad, calculator, alarm and games, as well as handheld options with various references.

A calendar icon can be chosen for entering a calendar program that can be used for establishing and managing events such as meetings or appointments. The calendar program could be any type of messaging or appointment/meeting program that allows an organizer to establish an event, for example, an appointment or meeting.

With the circuitry as described relative to FIGS. 1-5, the mobile wireless communications device 320 can be aware that the owner (or user) is hearing impaired such as when a wizard set up menu is established and the phone (or mobile device) is set up for a specific handicapped or hearing impaired individual. As an example, for the incoming phone call, for example, the green send button 338a can automatically enable speech-to-text behavior. For example, when the green send button 338a is pressed for answering an initial phone call and the user is hearing impaired, the phone can be programmed through the handicap module 300 or other module 302 to send automatically a greeting such as "hello." When the red end button 338d is depressed after a phone conversation is ended, a "thank you" could be sent. This could be advantageous when a handicapped user does not want to allow the initiator of a phone call on the other end to know that the one user is handicapped. Of course, the user would have to be a fast typist in order to make any conversation sound plausible as if the handicapped user were not handicapped. Also, the communication system would have to be bidirectional to allow intermixed conversation even when text is being typed and voice is passing from the other user and being converted into text.

All incoming calls can automatically be displayed in text format. Two-way communication such as speech-to-text on the hearing-impaired person's side or text-to-speech on the non-challenged person's side works automatically. It is possible to support full conference calling abilities and call waiting abilities. If multiple people are talking to a hearing impaired person, the mobile wireless communications device 320 can handle the calls automatically. It should be understood that the mobile wireless communications device 320 is not strictly limited to text. Every challenged person can have their own strengths and one challenged person can configure their phone to use a "text" option while others could prefer to read lips where a virtual person speaks the conversation on the device display 322, thereby allowing the person who reads lips to use the phone as well. A virtual person could display sign language also. This could be an adjunct to text-to-speech and speech-to-text conversion capability in which not only could various words be displayed, but also a virtual person would display lips as a help aid. Other users could prefer light pattern changes with the multiple LED's 308 in the mobile wireless communications device. The LED's 308 could change light or color patterns for hearing impaired persons such as giving specific color patterns or Morse code signals. Morse code is relatively easy and speech could be converted to text and/or Morse code signals as an aid.

Because phones have digital cameras, an individual could speak to a hearing impaired person using video webcam capabilities, thereby allowing the hearing impaired person to read lips such as with video conferencing capabilities or see hang sign language patterns. To accomplish this, the mobile wireless communications device of a non-challenged person could inform the owner that the other end is hearing impaired and has requested lip-reading or hand sign language patterns. A webcam or other video camera could automatically turn on and enable the communication. As an adjunct to this, it is possible to have real-time interpretation of sign language capabilities. Part of an engine as the video/webcam circuit 306 could convert speech to sign language or a pair of lips displayed using the virtual person as described before or convert sign language speech in real-time.

Figure 7:
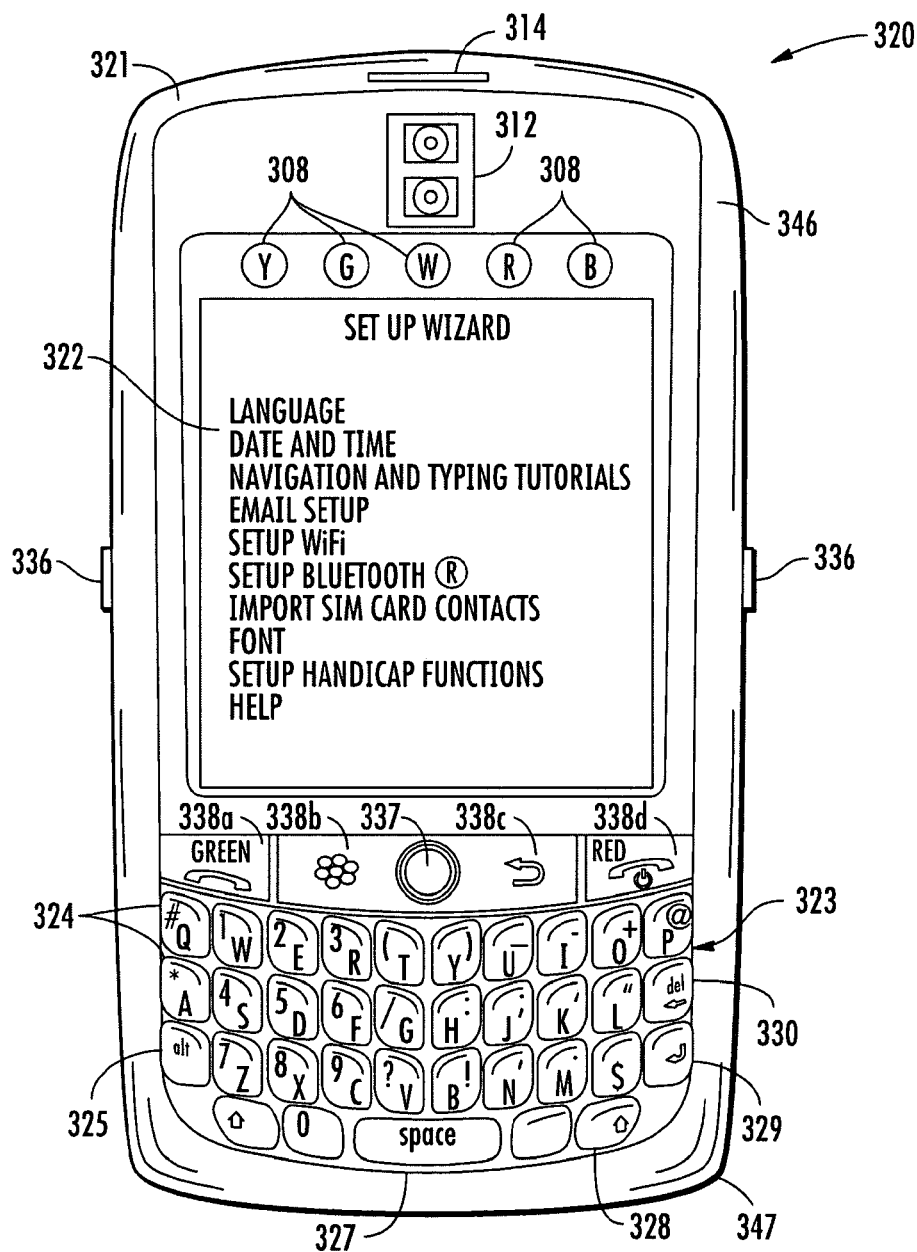
FIG. 7 is a front elevation view of the mobile wireless communications device shown in FIG. 6 in which a set up wizard for a handicap option is displayed.
Figure 8:
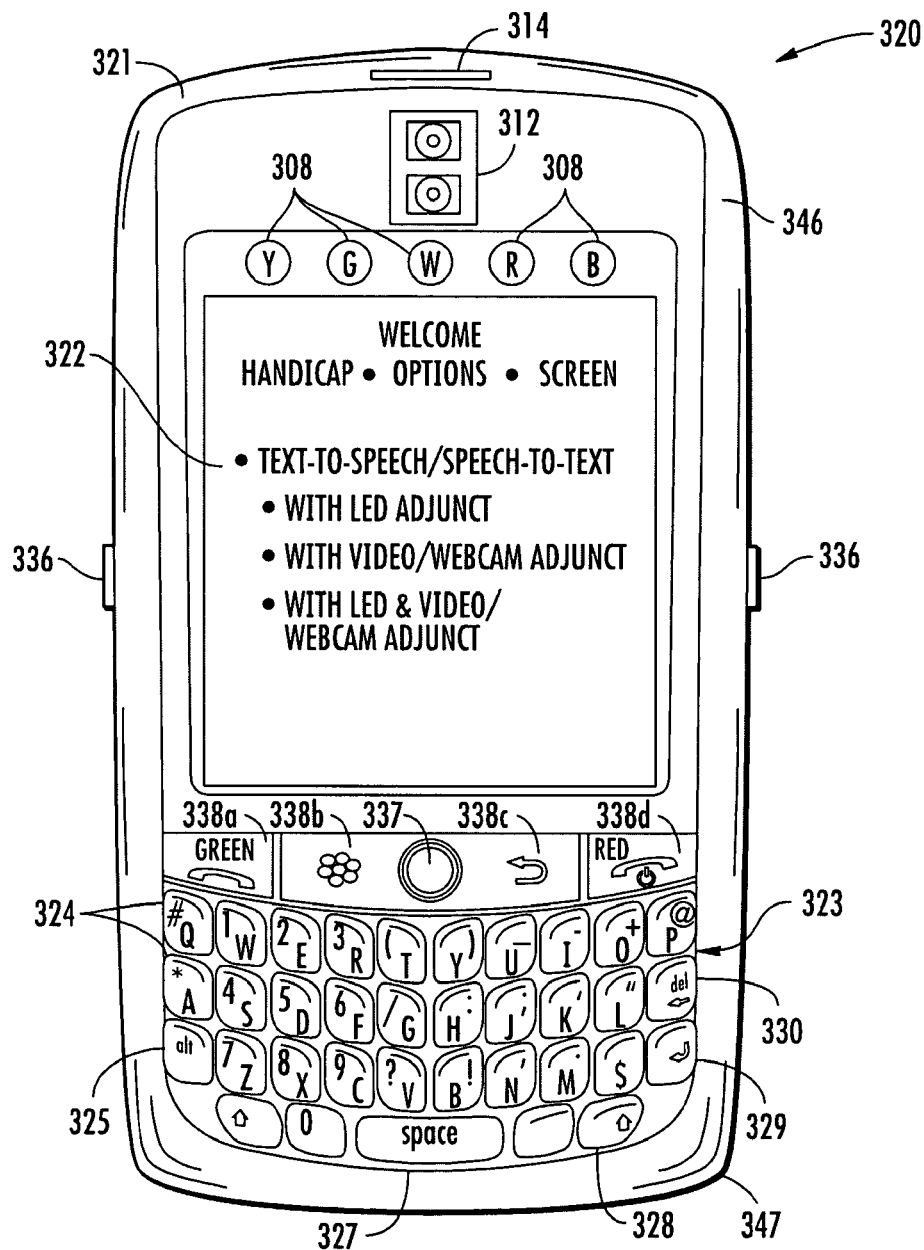
FIG. 8 is another front elevation view of the mobile wireless communications device similar to FIG. 7 and showing the various handicap options in the set up wizard for hearing and/or speech-impaired users.

FIGS. 6 and 7 are non-limiting examples of how an interface and set up wizard could be used for enabling a phone in a specific manner for a handicapped or challenged individual. Also, the device 320 could be implemented to default to various handicap options. For example, the track ball 337 could be pressed to enable certain graphical items to be selected on the display 322 as a graphical user interface and a set up wizard as shown in FIG. 7, having different options as non-limiting examples to be selected and allow set up of a preferred handicap function for a hearing impaired and/or speech impaired user. For example, the second to last option before the help option as shown in FIG. 7 is a set up handicap option that could be selected. In response to selecting the set up handicap option in FIG. 7, a welcome screen could be displayed for the handicap set up and various options displayed such as the text-to-speech/speech-to-text option with an adjunct that could be selected such as the LED assist and video/webcam circuitry enabled and as described above.

It should be understood that different synthesized speech and converter circuits can be used. A database could also be used to store sounds and words to assist in increasing the processing speed. The processor could be capable of processing received communications data as voice and determining if voice quality is good or if voice quality is difficult to understand and convert to text and turn the module 302 on or off as necessary. It is possible to generate voice extensible mark-up language (XML) data based on content that can be later transformed to speech. Speech synthesizer instructions could use packet technology. The processor could process packets and adjust fragmentation as necessary.

Figure 9:
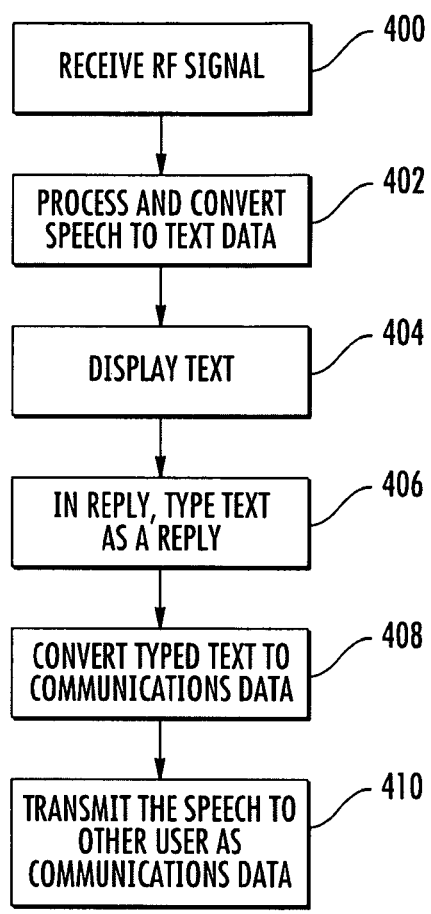
FIG. 9 is a flowchart of an example method.

FIG. 9 shows a method of communicating. A mobile wireless communications device receives a radio frequency (RF) signal carrying communications data of speech from another user operating a communications device (Block 400). The communications data of speech is processed and converted to text data (Block 402). The text is displayed on a display of the communications device (Block 404). In reply to the displayed text corresponding to the speech of the other user, text is typed as a reply (Block 406). The typed text is converted to communications data of speech (Block 408). The communications data of speech is transmitted to the other user operating a communications device (Block 410).

Many modifications and other example embodiments of the invention will come to the mind of one skilled in the art having the benefit of the teachings presented in the foregoing descriptions and the associated drawings. Therefore, it is understood that the invention is not to be limited to the specific example embodiments disclosed, and that modifications and example embodiments are intended to be included within the scope of the appended claims.

That which is claimed is:

1. A mobile wireless communications device comprising:
a radio frequency (RF) transceiver;
a keyboard;
a display; and
a processor, communicatively coupled with the RF transceiver, the keyboard and the display, that
converts speech data received from the RF transceiver to text displayed on the display,
converts text input at the keyboard into speech data transmitted from the RF transceiver, and
generates a visual supplement for the text displayed on the display.

2. The mobile wireless communications device according to claim 1, further comprising an indicating light; and
wherein the processor generates the visual supplement for the text displayed on the display, as a light pattern via the indicating light.

3. The mobile wireless communications device according to claim 1, further comprising a plurality of different colored indicating lights; and wherein the processor generates the visual supplement for the text displayed on the display, as a light pattern via the plurality of different colored indicating lights.

4. The mobile wireless communications device according to claim 1, wherein the processor generates the visual supplement for the text displayed on the display, as a virtual attendant displayed on the display.

5. The mobile wireless communications device according to claim 4, wherein the virtual attendant displays at least one of sign language patterns and lip motion.

6. The mobile wireless communications device according to claim 1, further comprising a camera; and wherein the processor converts images of user sign language from the camera to supplement speech data transmitted from the RF transceiver.

7. The mobile wireless communications device according to claim 1, wherein the processor displays a set up screen having a selectable handicap option for enabling the speech-to-text and text-to-speech conversions.

8. The mobile wireless communications device according to claim 7, wherein the selectable handicap option comprises a default setting.

9. The mobile wireless communications device according to claim 1, further comprising a first key; and wherein the processor operates the RF transceiver to transmit speech data indicative of a greeting in a telephone call in response to the first key.

10. The mobile wireless communications device according to claim 1, further comprising a second key; and wherein the processor operates the RF transceiver to transmit speech data indicative of a ending a telephone call in response to the second key.

11. The mobile wireless communications device according to claim 1, further comprising a speaker; and wherein the processor outputs audio speech from the speaker in addition to the speech as text on the display.

12. The mobile wireless communications device according to claim 1, wherein the display and the keyboard are integrated together.

13. A method of operating a mobile wireless communications device comprising:
   operating a processor to:
      convert speech data received from a radio frequency (RF) transceiver to text displayed on a display,
      convert text input at a keyboard into speech data transmitted from the RF transceiver, and
      generate a visual supplement for the text displayed on the display.

14. The method according to claim 13, wherein operating the processor to generate the visual supplement for the text displayed on the display, comprises operating at least one indicating light.

15. The method according to claim 13, wherein operating the processor to generate the visual supplement for the text displayed on the display, comprises operating a plurality of different colored indicating lights.

16. The method according to claim 13, wherein operating the processor to generate the visual supplement, for the text displayed on the display, comprises generating a virtual attendant displayed on the display.

17. The method according to claim 16, wherein the virtual attendant displays at least one of sign language patterns and lip motion.

18. A non-transitory computer readable medium which when executed on a processor of a mobile wireless communications device causes the processor to:
   convert speech data received from a radio frequency (RF) transceiver to text displayed on a display;
   convert text input at a keyboard into speech data transmitted from the RF transceiver; and
   generate a visual supplement for the text displayed on the display.

19. The non-transitory computer readable medium according to claim 18, wherein generating the visual supplement for the text displayed on the display comprises operating at least one indicating light.

20. The non-transitory computer readable medium according to claim 18, wherein generating the visual supplement for the text displayed on the display comprises operating a plurality of different colored indicating lights.

21. The non-transitory computer readable medium according to claim 18, wherein generating the visual supplement for the text displayed on the display comprises generating a virtual attendant displayed on the display.

22. The non-transitory computer readable medium according to claim 21, wherein the virtual attendant displays at least one of sign language patterns and lip motion.

\* \* \* \* \*